July 23, 1935.  W. J. MULLER  2,008,724
AUTOMOBILE
Filed Nov. 25, 1931  8 Sheets-Sheet 2

July 23, 1935. W. J. MULLER 2,008,724
AUTOMOBILE
Filed Nov. 25, 1931 8 Sheets-Sheet 4

Fig 4

INVENTOR
William J. Muller

Patented July 23, 1935

2,008,724

UNITED STATES PATENT OFFICE 2,008,724

AUTOMOBILE

William J. Muller, Philadelphia, Pa.

Application November 25, 1931, Serial No. 577,243

6 Claims. (Cl. 180—54)

This invention relates to automobiles and it has for one of its primary objects the provision of improvements whereby a body (exclusive of the hood) may be provided of substantially the same length as the wheelbase or greater, with ample leg room, irrespective of whether the car is front or rear drive, or whether the gas tank is within the hood or the rear engine compartment.

Another object of the invention is to provide an arrangement whereby in addition to the above, a cooler car may be had with the conventional location of the engine.

Still another object of the invention is to make it possible—even with a body of the length above indicated—to have a cowl of substantial dimensions, with a hood of relatively short length, while at the same time all portions of the power plant are readily accessible.

More specifically, it is an object of the invention to provide a very simple and compact power plant and drive, suitable for either front or rear drive.

Another object of the invention is to make possible the use of a straight, inexpensive frame, one which may be made by a simple breaking operation as compared with the conventional frame which must be made with dies. This makes possible a low car even with larger wheels than usual, thus giving improved riding qualities.

A further object of the invention is to provide a cool front wheel drive (front wheel drive cars are objectionably hot) and to secure sufficient weight on the front wheels to overcome the slippage and consequent rapid wear of the front tires which has hitherto been the difficulty in front wheel drives.

My invention also contemplates an arrangement in which all of the above characteristics, if desired, may be employed while still obtaining beautiful and symmetrical lines; and while making it possible to provide a nine passenger body, having ample space, with a wheelbase in the neighborhood of 100 inches (a seven passenger body of conventional design requires a wheelbase of approximately 125 inches)—this, even with the gas tank in front, within the hood, or in back, within the rear engine compartment.

My invention further contemplates the provision of a super-charger in the power plant without sacrificing the foregoing advantages.

In addition, my invention has to do with certain novel features and combination of parts in the power plant, drive, and gear-shift, as will hereinafter more particularly appear.

A more specific object of the invention is to overcome idling difficulties in a super-charged power-plant, whether the engine is of the two or four cycle type.

Another object of the invention is having a two cycle engine in which provision is made for preventing the engine from running backward; and in which the mixture is not passed through the crank-case, whereby fouling and concomitant difficulties are avoided.

While I shall describe my invention as embodying a two cycle engine in the power plant, with opposed cylinders, it is to be understood, it is equally applicable to engines of the four cycle type, and to arrangements in which the cylinders are disposed otherwise than in opposed relation.

I accomplished the foregoing, together with such other objects and advantages as may hereinafter appear, or are incident to my invention, by means of a construction which I have illustrated in the accompanying drawings in preferred form, wherein.

Figure 1:
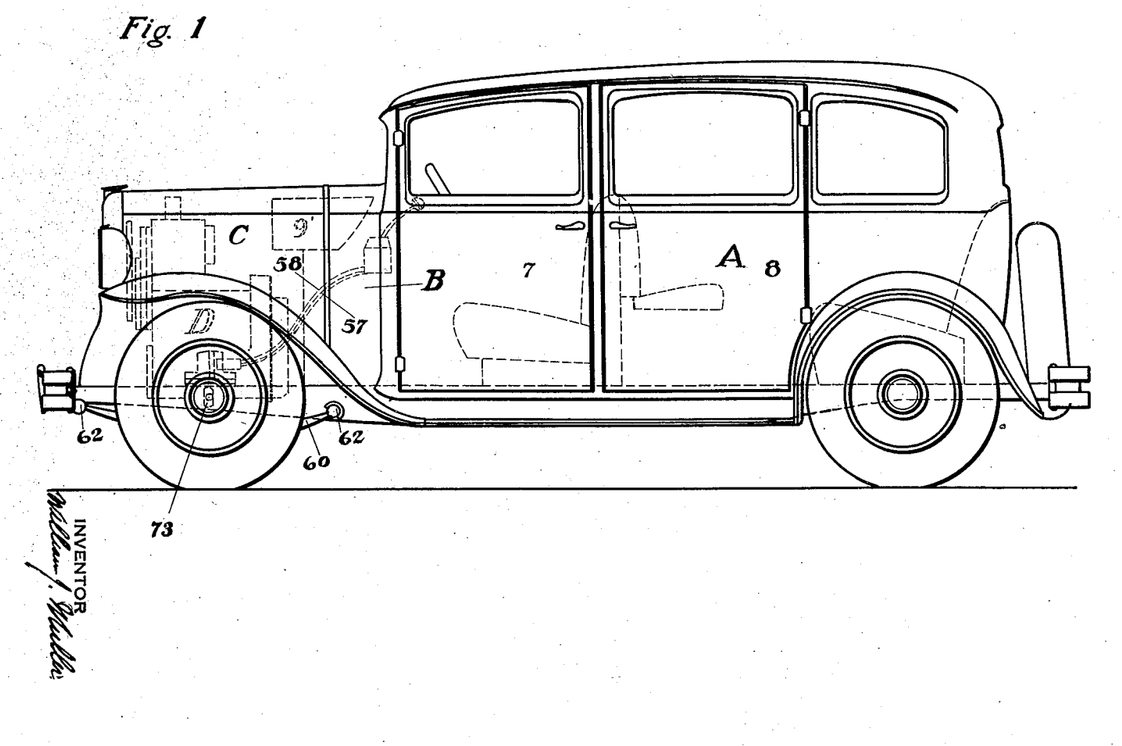
Fig. 1 is a side elevation of a car embodying my improvements with front wheel drive.

Referring now to Figure 1, I have shown a front wheel drive car in which the body proper "A" is substantially as long as the wheel-base, providing the seating capacity herein before specified. The body has a substantial cowl "B" which gives ample leg room and assists in making wide doors, 7—8, possible. It will be observed that the arrangement is one which has unusually wide doors, facilitating ingress and egress. The hood "C" is relatively short but in conjunction with the cowl, gives good lines to the car, notwithstanding the length of the body proper.

The power-plant "D" is very compact and is accommodated entirely within the hood and may be fully exposed. The gas tank 9 is also within the hood and cowl. With the low setting of the engine, improved ventilation and consequently a cooler front compartment are obtained.

The construction and disposition of the parts of the power plant, which contribute largely to obtaining advantages noted, will now be described, reference being had particularly to Figures 2—3—4.

In the arrangement shown in these figures, the cylinders 10 are horizontally disposed in opposed relation, a six cylinder engine being illustrated. The cylinders are cast enblock, preferably integral with the case 11 which houses the combined transmission and drive, indicated as a whole by the reference character "E". This gives a straight bore for both sets of cylinders and also a straight bore for both main-shaft 12 and counter-shaft 13 of the transmission. The crank-shaft 14 is inserted from above through space 15, the upper halves 16 of the main bearings being then inserted and the cover 17 bolted in place, onto the integral casting comprising the cylinders and case. It will be understood that the crank-shaft carries the flywheel 18 and clutch 19, the flywheel having the starter teeth 20. The starter is indicated at 21 in Figure 2. The flywheel and clutch are insertable through the open end 21' of the case 11 which is closed by the removable cover 22. The shaft 23 has the usual splined end on which the usual friction plate 24 is mounted. The shaft 23 is piloted in the crankshaft and has a bearing in the cover. The pressure plate is operated by the usual yoke indicated at 25. The shaft has a sprocket 26. The main shaft of the transmission has a sprocket 27, the chain 28 forming the driving connection between the sprockets. The main shaft has a bearing in case 11, at 29, and a bearing in the cover 22, at 30. The plate 31, with usual oil seals where the shafts project therethrough, prevents oil from working in from compartment 32.

At its inner end, shaft 12 has a pinion 33 which is constantly in mesh with the gear 34 on the countershaft. Direct drive between the shaft 12 and shaft 12' is had in the usual way by shifting a slide dog 35 which also carries the gear 36. When the gear 36 is shifted to the left to engage with gear 37, second speed is obtained. When gear 38 is shifted to the right to mesh with gear 39, first speed is had, and when shifted to the left, reverse is obtained. The shaft portion 12' has a worm 40 adapted to engage with the worm wheel 41 within which is a conventional differential 42, diagrammatically indicated. The worm 40 is preferably integral with the shaft, and the shaft has a bearing 43 at either end of the worm. These bearings are combination thrust and radial bearings and no other bearings are needed since the gears 36 and 38 are disposed on opposite ends of shaft 12' and are relatively close to the bearings 43 under all conditions. Whipping is thus avoided. A speedometer drive 44 is provided on the left hand end of shaft 12'.

The cylinders of the engine—in this case a two cycle engine—are supplied with the mixture by the manifold 45, through the medium of the blower 46. The carburetor 47 is secured to the top of the blower and is of the down draft type. The blower is of the Roots type (see Fig. 5) and the rotors are driven from the crank-shaft 14 by V belts 48 and double groove pulleys 49 and 50. This type of drive for the rotors is very advantageous as it relieves shock, relieving the gears 51 which impart the rotary movement which is given to one of the rotors by the belts, to the other rotor.

The blower delivers the mixture to the cylinders under a pressure directly related to the engine speed, which pressure, even though a substantial clearance is provided between rotors mounts to as high as 5 lbs. Thus the size of the cylinders for any given H. P. as compared with standard practice can be materially reduced. This reduction and the disposition of the cylinders to either side of the crank-shaft, in direct opposed or even in V relation, give a compactness, particularly when the transmission and differential are co-ordinated as shown, which makes it possible to accessibly house the power plant in the relatively short hood, as shown. On the scale shown, the hood is about 33" long.

The blower is mounted on the cover 17 by means of a bracket 52 which may be made integral with the blower casing.

Access to the motor is therefore had by removing the blower, manifold and covers.

Figure 2:
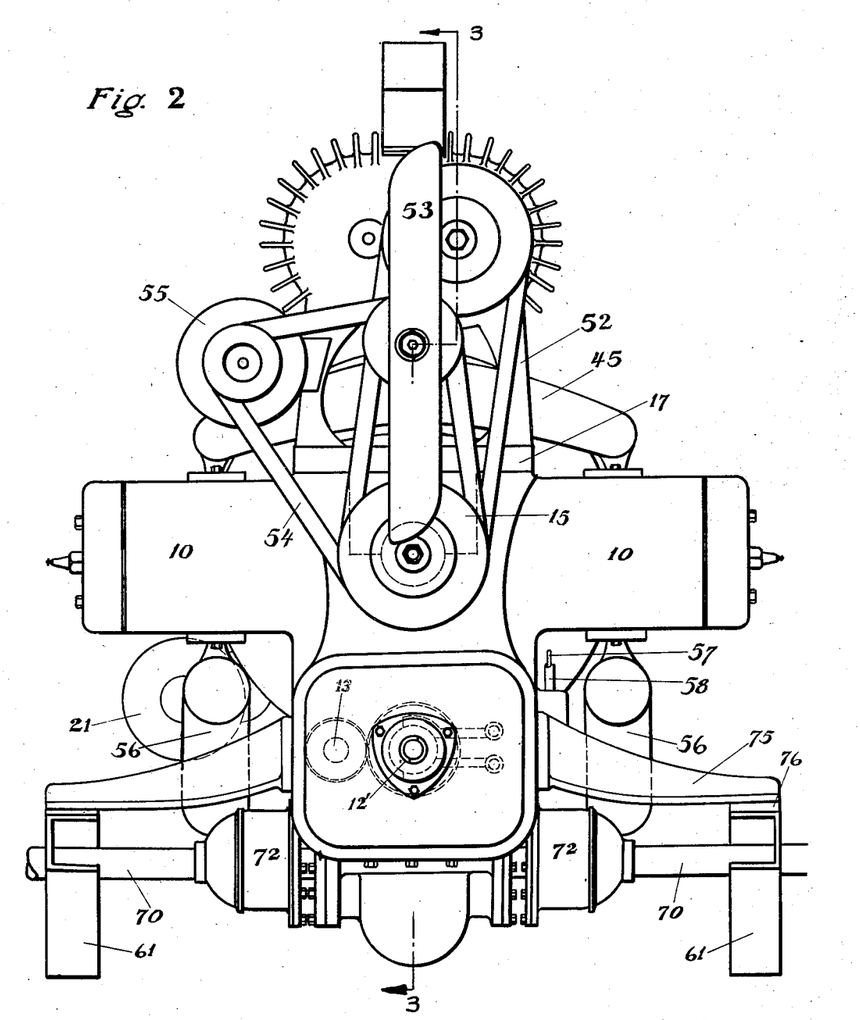
Fig. 2 is a front elevation of the power plant, drawn on an enlarged scale.
Figures 3, 3A:
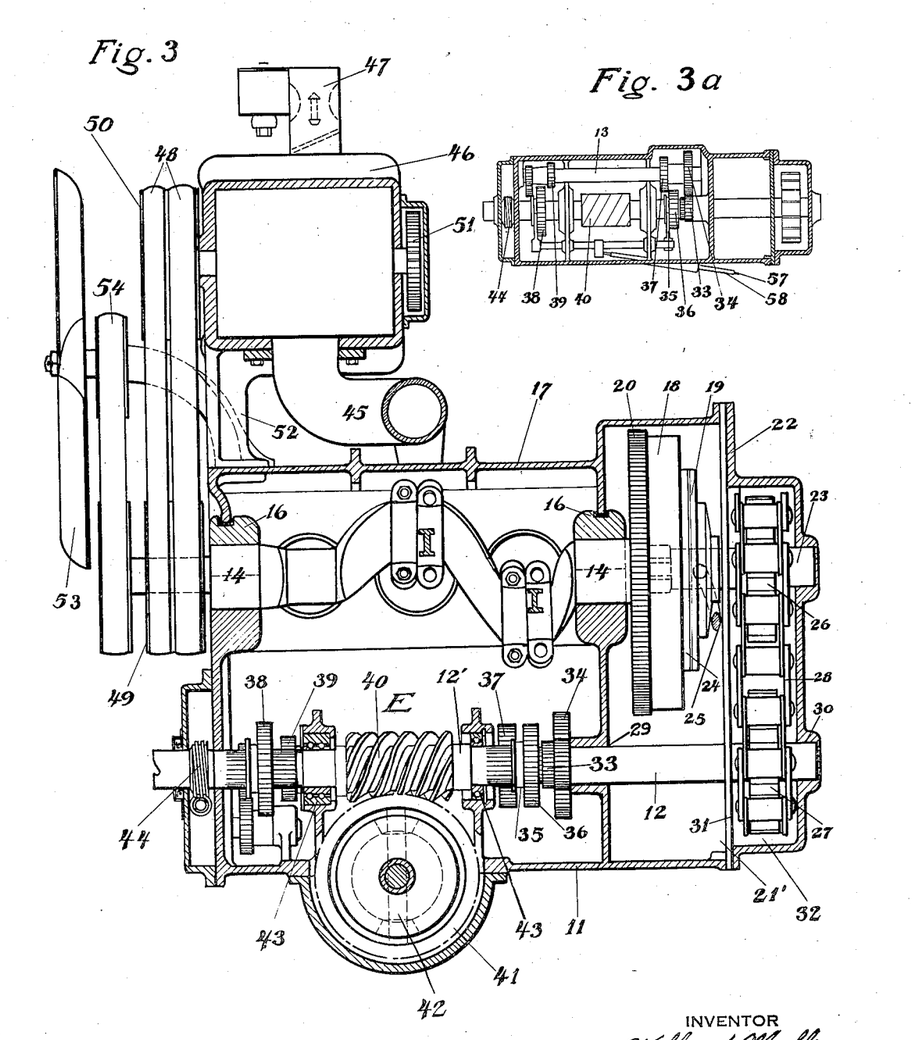
Fig. 3 is the section taken on a line 3—3 in Fig. 2.
Fig. 3a is a horizontal section through the transmission, drawn on a small scale.
Figure 4:
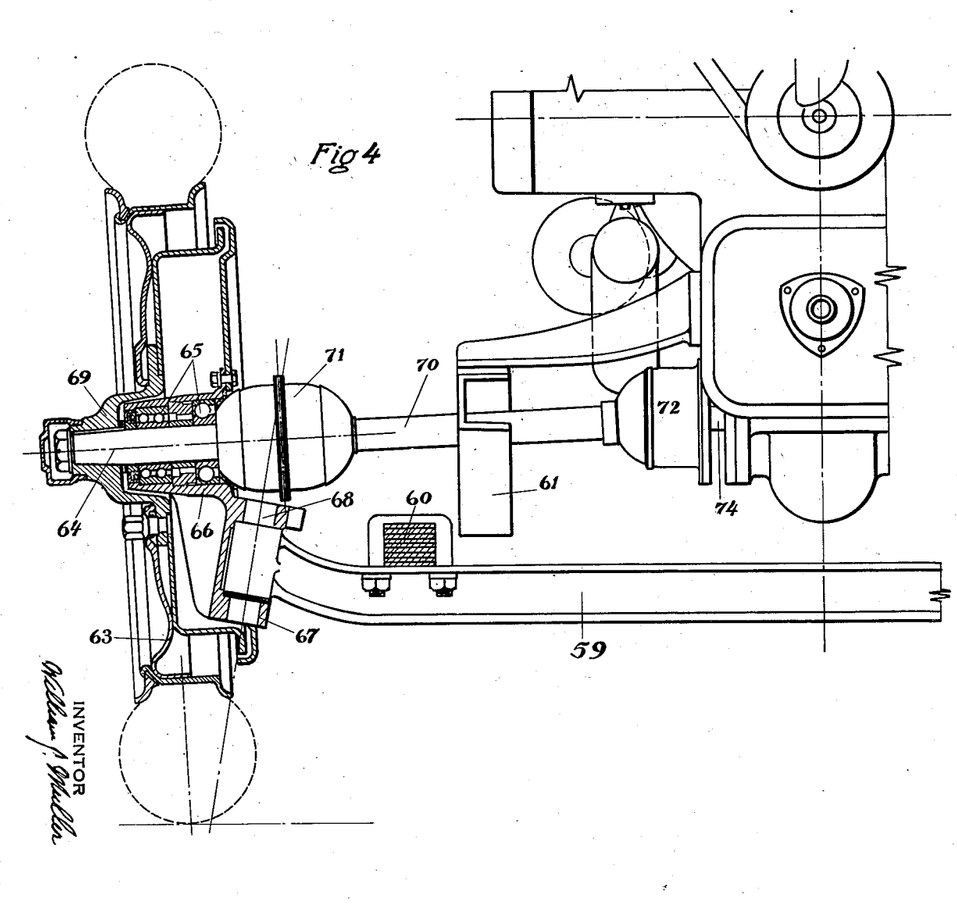
Fig. 4 is an enlarged view, partly in front elevation and partly in section, illustrating the drive.

The fan 53 is driven from the crankshaft, Figures 2—3, the belt 54 also driving the generator 55 which may be carried from the blower bracket, as indicated in Figure 2.

The reference numeral 56 indicates the exhaust manifold for the cylinders.

The gears are shifted in the usual manner, preferably through the medium of a cable 57 in a conduit 58.

Referring now to the drive, the car has a conventional front axle 59, the springs 60 of which are shackled to the frame 61 in the usual manner, as shown at 62 in Figure 1. The wheels 63 are supported from the spindles 64 which, in turn, through the medium of the bearings 65, are supported in sleeves 66 which are formed integral with the steering knuckles 67, supported from the axle by the angularly disposed king pins 68. The hubs 69 of the wheels are keyed to the spindles 64 and the spindles are driven by the two drive shafts 70, suitable universal joints, 71—72, being provided. The axis of the universals 71 is offset with respect to the axis of the king pins and the axis of the wheels is also offset in respect to axis of the king pins, as indicated in Figure 4. This, together with the canting of the wheels, prevents wandering.

It will be observed that the drive shafts 70 extend through the frame side members for which purpose the latter are provided with slots 73, permitting the shafts 70 to rock up and down under operating conditions. This construction is made possible by the employment of the front axle and, in turn, it makes possible the use of straight side members in place of the bent side members which would otherwise be required. It will of course be understood that short lengths of drive shafts 74 extend from the universals 72 to the differential mechanism 42.

In addition to the compactness of the power-plant, it will be seen that the power plant is supported from the frame side members by the brackets 75 which are located at about the middle of the power plant, lengthwise considered, the brackets being also located substantially in the plane of the drive shafts. Thus the reacting torque is distributed, the front axle being relieved of some of it because the power plant is free to rock, this being facilitated by providing a yielding means between the brackets 75 and the frame side members, such as rubber pads 76. Thus smoothness is obtained and vibration from the engine minimized. It also makes possible the use of parts of lighter construction.

Figure 5:
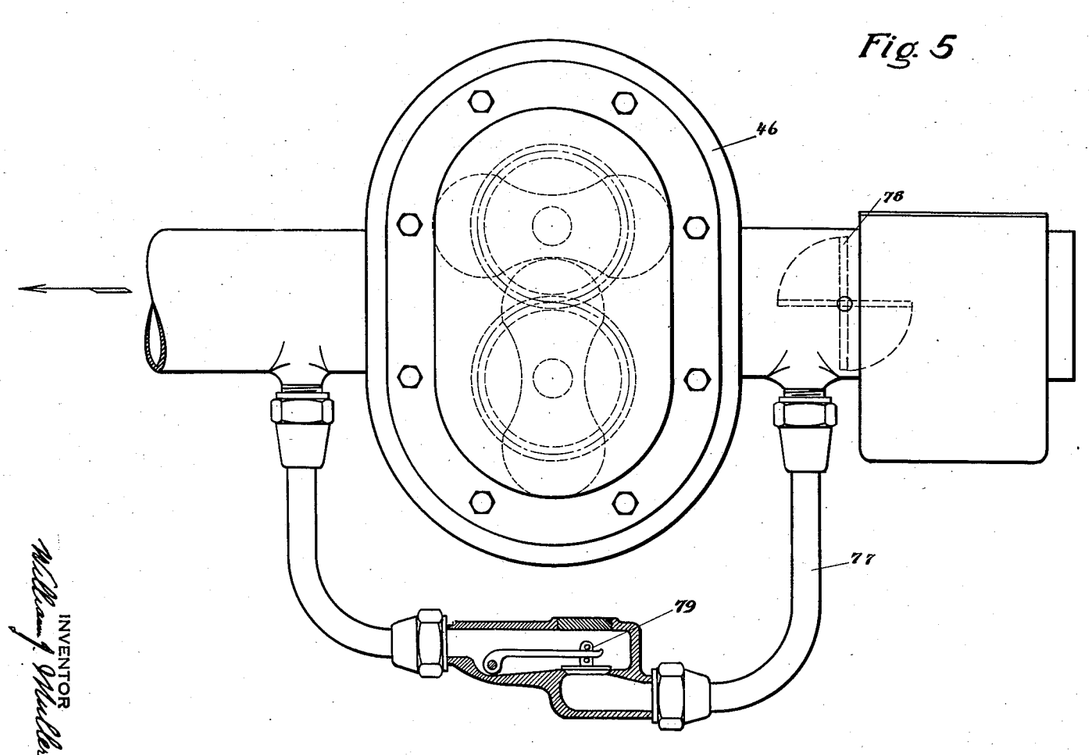
Fig. 5 is a view illustrating the manner in which the power plant may be idled.

In order to permit idling, where difficulty has been encountered with forced induction engines with the carburetor in advance of the blower, I provide a bypass 77 around the blower 46 as shown in Figure 5, this bypass being taken off the manifold at a point intermediate of the throttle and the blower. The bypass has an automatic valve 79 weighted so as to open when the vacuum in the manifold on the engine side of the blower increases much above the vacuum maintaining on the carburetor side of the blower. When the engine speed is decreased, as when idling, it will be seen that the restriction offered by the blower results in low vacuum on the carburetor side of the blower and this together with the pulsations of the blower at low speed, make it difficult to idle the engine. However by the provision of the bypass, this condition is avoided and the vacuum at opposite sides of the blower is equalized and assures a supply of mixture to the engine. The arrangement in Figure 5 is suitable for four cycle engines. In a two cycle engine, there are no vacuum conditions to consider.

Figure 8:
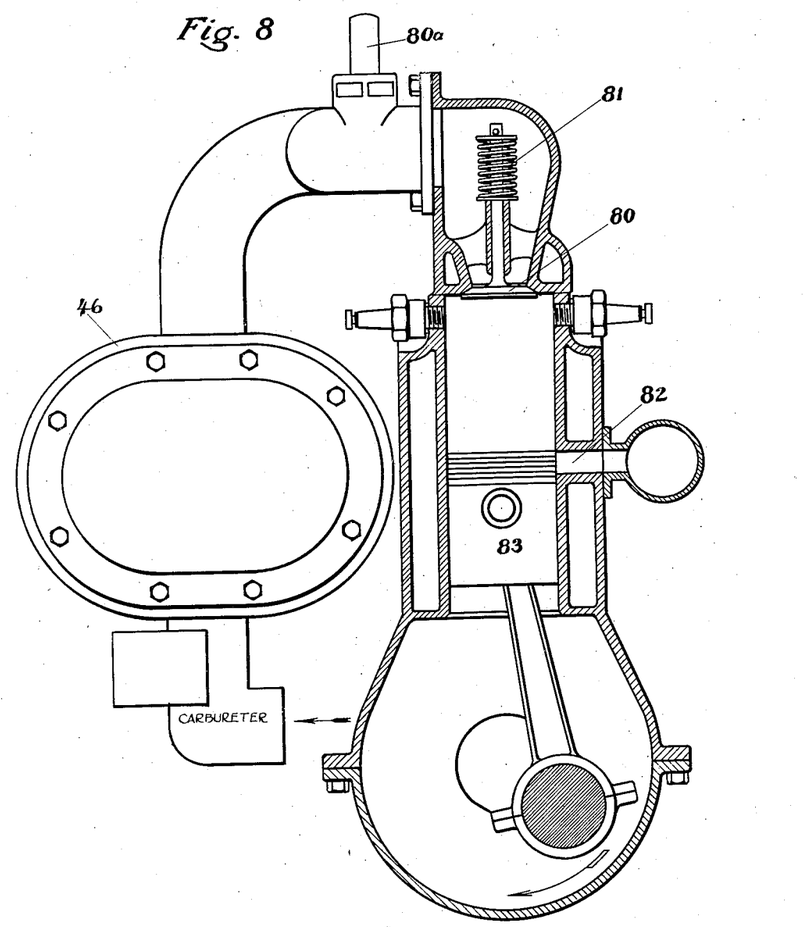
Fig. 8 is a detailed view illustrating the manner in which the mixture is delivered by the blower or super-charger to the engine and also illustrating some of the details, and some of the construction of the engine and other parts, the engine in this instance being of conventional disposition.

When using the blower with a two cycle engine, which is my preferred arrangement, it will be seen that the mixture is not passed through the crank-case but is delivered directly to the cylinders by the blower. The inlet valves 80 are located in the cylinder head and they are normally held closed by springs 81 of a force sufficient to keep the valve on its seat at atmospheric pressure. Thus cam-shafts may be avoided and the valves will automatically open under the influence of the pressure developed by the blower. The valves will open shortly after the exhaust ports 82 begin to be uncovered by the piston 83. The pressure of the incoming charge effectively scavenges the spent charge. The valves automatically close when the pressure within the cylinders becomes greater than that generated by the blower, as the piston moves on compression stroke. The greater the number of cylinders, the more smooth the operation. To prevent explosion and combustion in the manifold and to relieve the rotors of shock in case of back firing from the engine, I provide a relief valve 80a, set to open at a pressure slightly above the maximum pressure developed by the blower.

Figure 6:
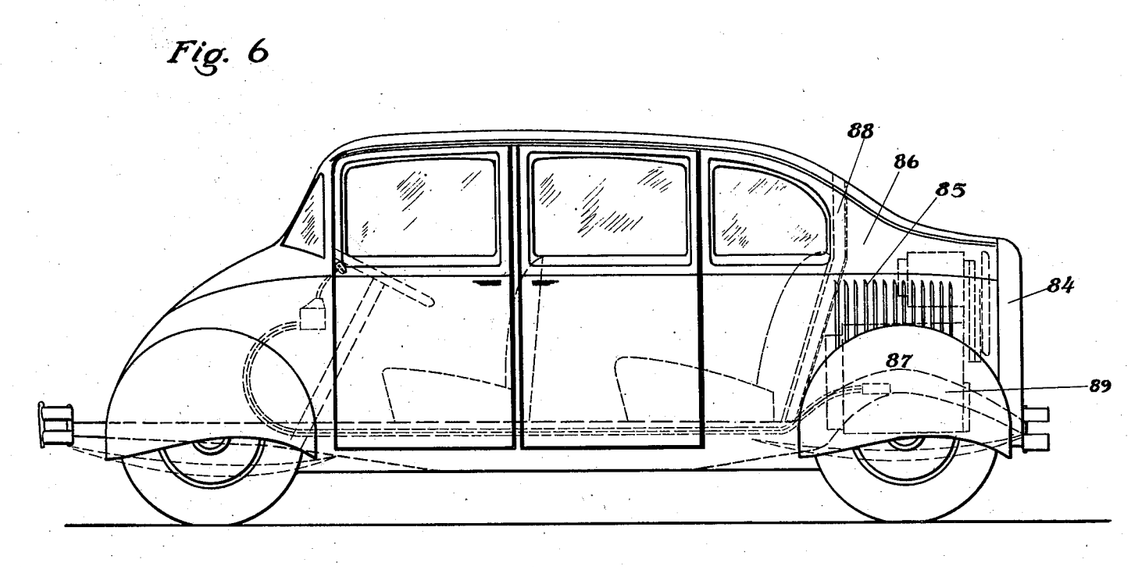
Fig. 6 is a side elevation of a rear drive car embodying my invention.

Referring now to Figure 6, I have there shown my invention applied with the power plant on the rear axle. In this construction, the radiator 84 is of course located at the rear. Forwardly opening louvres 85 are provided in the engine compartment 86, the fenders 87 helping to deflect air thereto. This, together with the rearward location of the fan, effectively ventilates the rear compartment. Should however the rear car compartment become too hot, an air insulated compartment 88 may be provided. This compartment may be open at top and bottom and the suction passing over the top of the car will draw air through the compartment.

Figure 7:
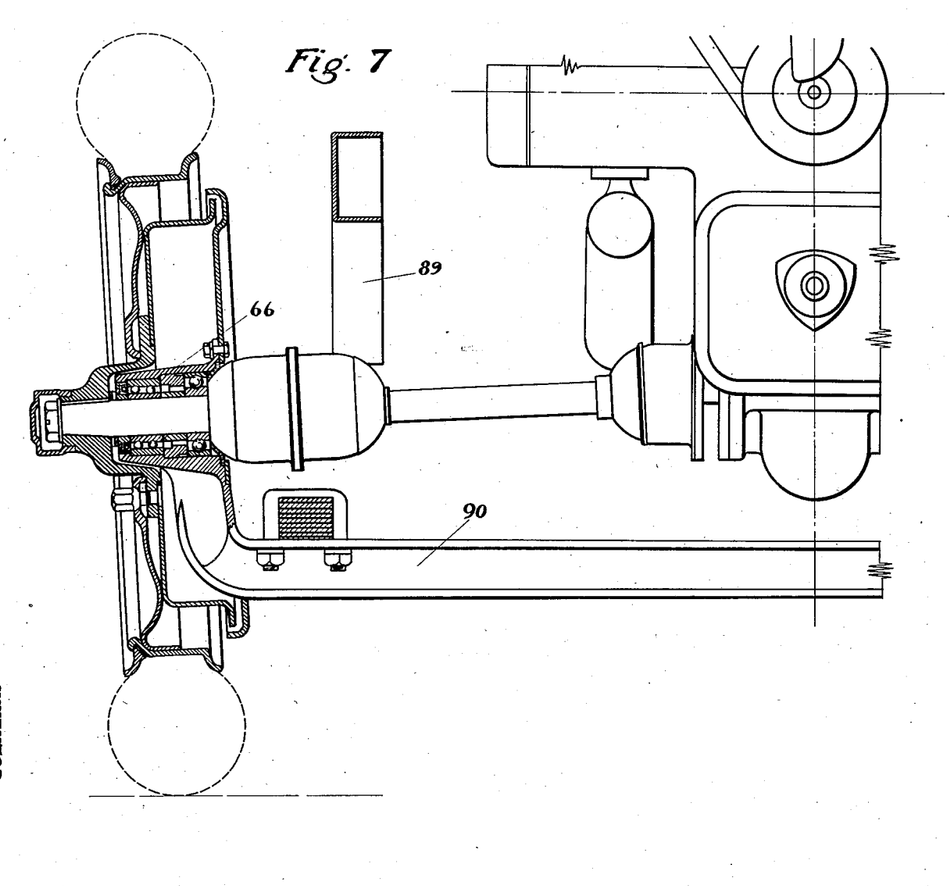
Fig. 7 is a half rear elevation and section illustrating the rear drive.

The drive employed in this case is substantially the same as that used when the power plant is in front. It is shown in Figure 7. A kickup 89 is provided in the frame. No steering knuckle being necessary the sleeve 66 is directly secured to the rear axle 90 as shown.

What I claim is:—

1. A power plant for automobiles comprising a combined integral crank case and transmission case vertically serially arranged, with cylinders integral therewith in opposed relation, the case having a recess for inserting the crank-shaft, a crank-shaft, a cover for the recess, a combined transmission and differential in the transmission case, and means for operatively associating the crank-shaft and the transmission.

2. A power plant for automobiles comprising a combined integral crank case and transmission case vertically serially arranged, with cylinders integral therewith in opposed relation, the case having a recess for inserting the crank-shaft, a crank-shaft, a cover for the recess, a combined transmission and differential in the transmission case, means operatively associating the crank-shaft and transmission, a blower mounted on the cover, means for driving the blower from the shaft, a manifold between blower and the cylinders, and a carburetor connected with the blower.

3. In a power plant, cylinders, a crank-case and a transmission case cast integral, said casting having an open ended compartment, a crank-shaft having an end projecting into said compartment, a flywheel and clutch housing insertable through said open end and adapted to be carried by the crank-shaft, a cover for the compartment, a shaft piloted into the crankshaft and having a bearing in said cover, a clutch pressure plate carried on said shaft, a sprocket on said shaft, a transmission in said transmission case including main and counter shafts, a sprocket on the main shaft, a chain running over said sprockets and a worm drive associated with said transmission.

4. In a power plant, vertically serially arranged blower, cylinders arranged in opposed groups, a crank case, a transmission case with transmission parts mounted therein, and differential, a crank-shaft, driving means between the crank-shaft and the transmission, and driving means between the shaft and blower.

5. In a power plant, vertically serially arranged blower, cylinders arranged in opposed groups, a crank case, a transmission case with transmission parts mounted therein, and differential, a crank-shaft, driving means between the crank-shaft and transmission, a fan and driving means between the shaft and fan and blower, a carburetor above and carried by the blower, and a fan carried from the blower and driven from the engine.

6. In a power plant, vertically serially arranged blower, cylinders in opposed groups, a crank case, a transmission case with transmission parts mounted therein, and differential, a crank-shaft, driving means between the crank-shaft and transmission located at one end of the crank-shaft, and driving means between the shaft and blower located at the other end of the shaft.

WILLIAM J. MULLER.